(Model.)
7 Sheets—Sheet 1.
L. ACHESON.
MACHINE FOR MAKING RAILROAD SPIKES.
No. 307,420.  Patented Nov. 4, 1884.
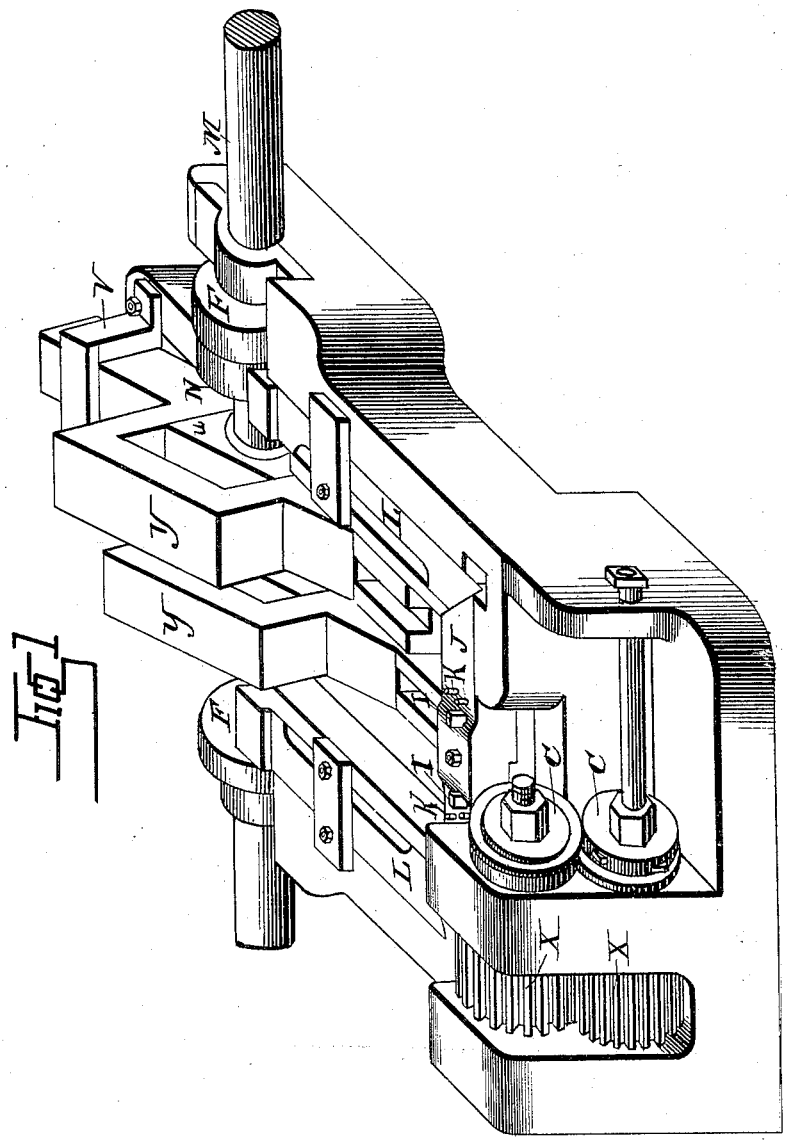
WITNESSES:
INVENTOR,
Leonard Acheson
By DeWitt C. Allen
ATTORNEY.

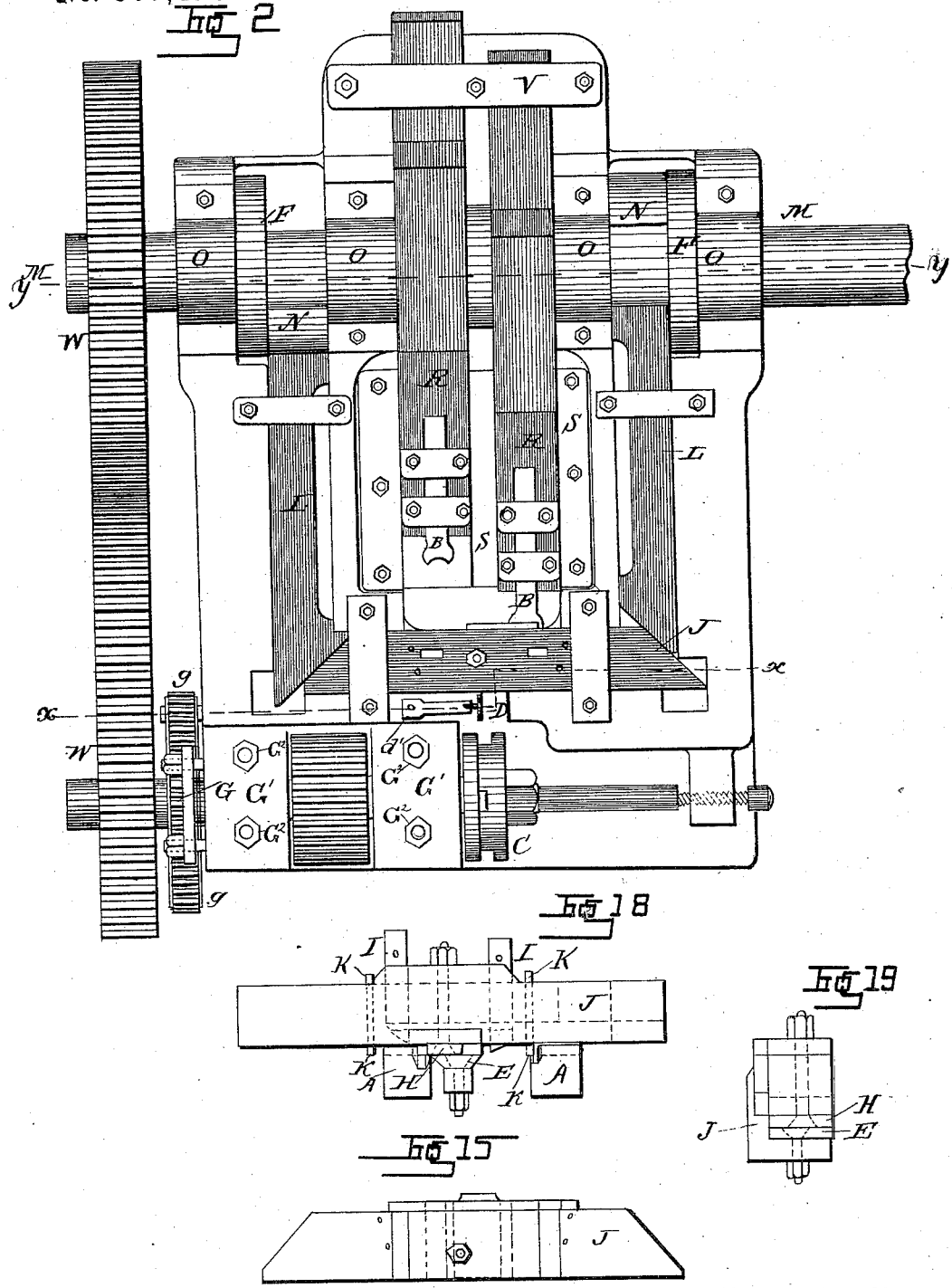

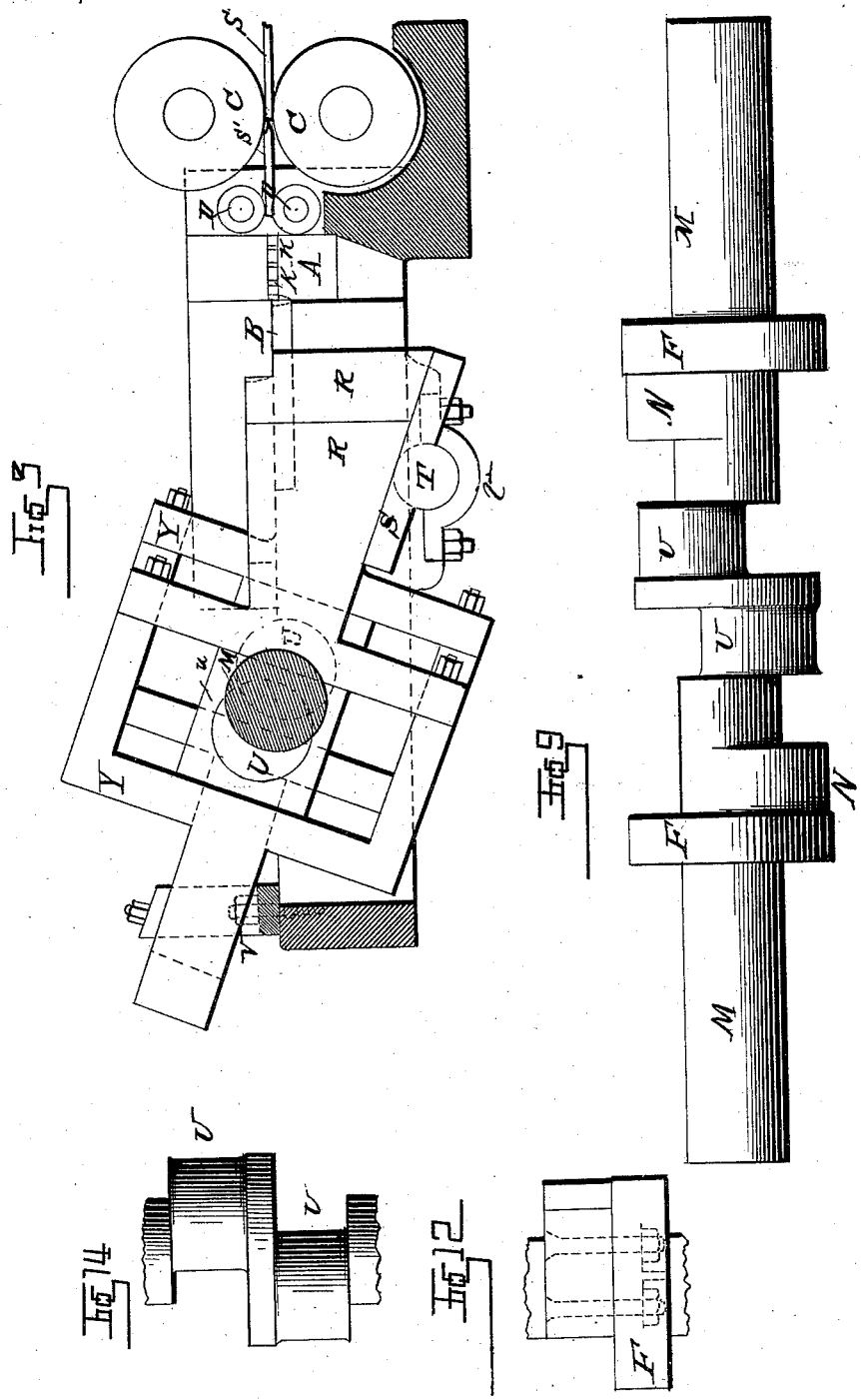

(Model.) 7 Sheets—Sheet 4.
L. ACHESON.
MACHINE FOR MAKING RAILROAD SPIKES.
No. 307,420. Patented Nov. 4, 1884.
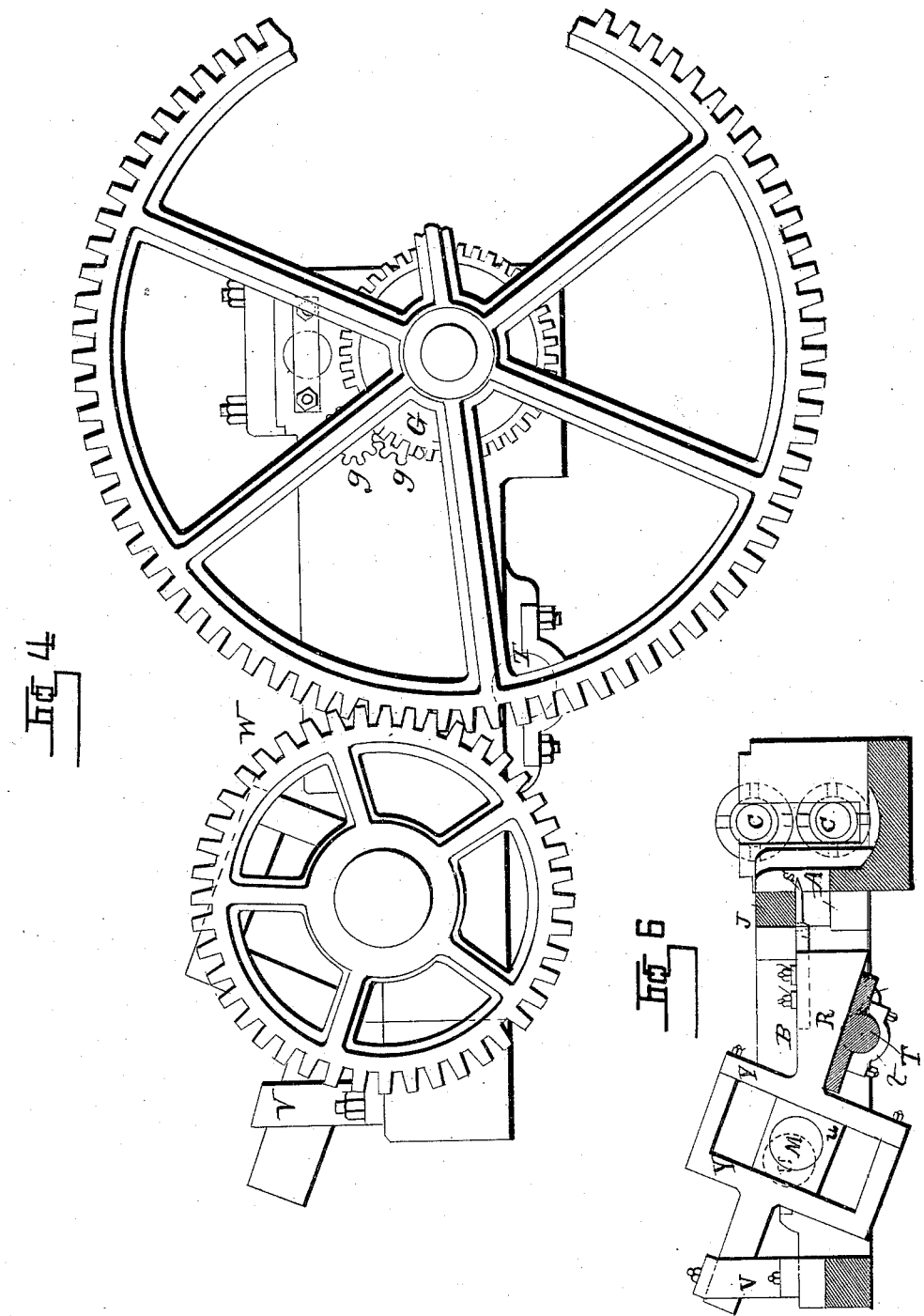
WITNESSES:
Fred. G. Dieterich
Wm. T. King
INVENTOR.
Leonard Acheson
By DeWitt C. Allen
ATTORNEY.

(Model.)
L. ACHESON.
MACHINE FOR MAKING RAILROAD SPIKES.
No. 307,420. Patented Nov. 4, 1884.
7 Sheets—Sheet 5.
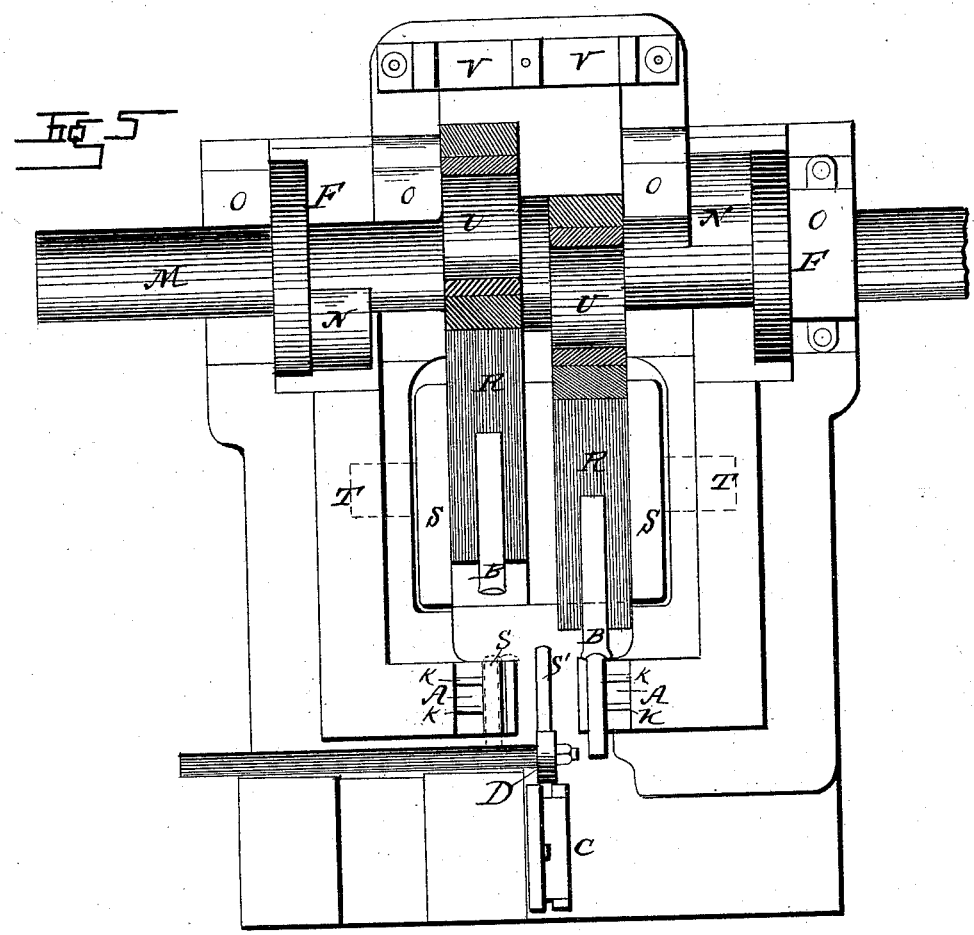
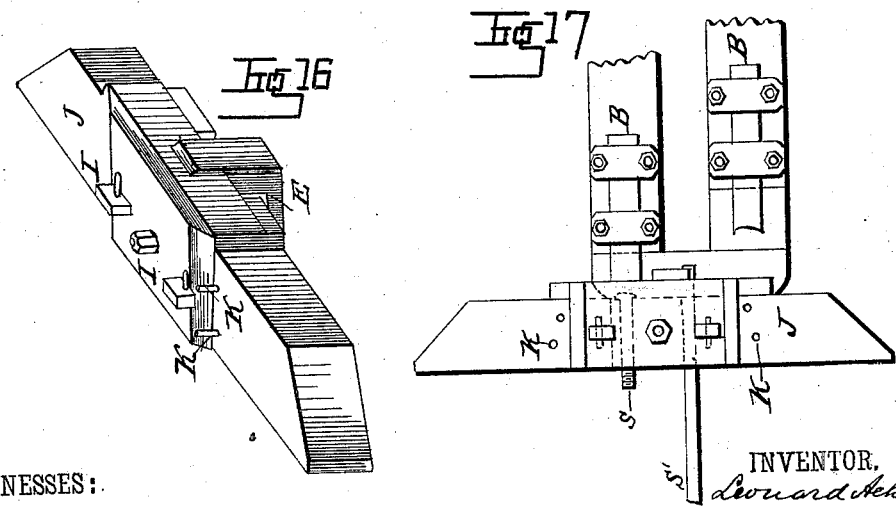
WITNESSES:
Fred G. Dieterich
Wm. J. King
INVENTOR.
Leonard Acheson
By DeWitt C. Allen
ATTORNEY.

(Model.)
7 Sheets—Sheet 6.
L. ACHESON.
MACHINE FOR MAKING RAILROAD SPIKES.
No. 307,420. Patented Nov. 4, 1884.
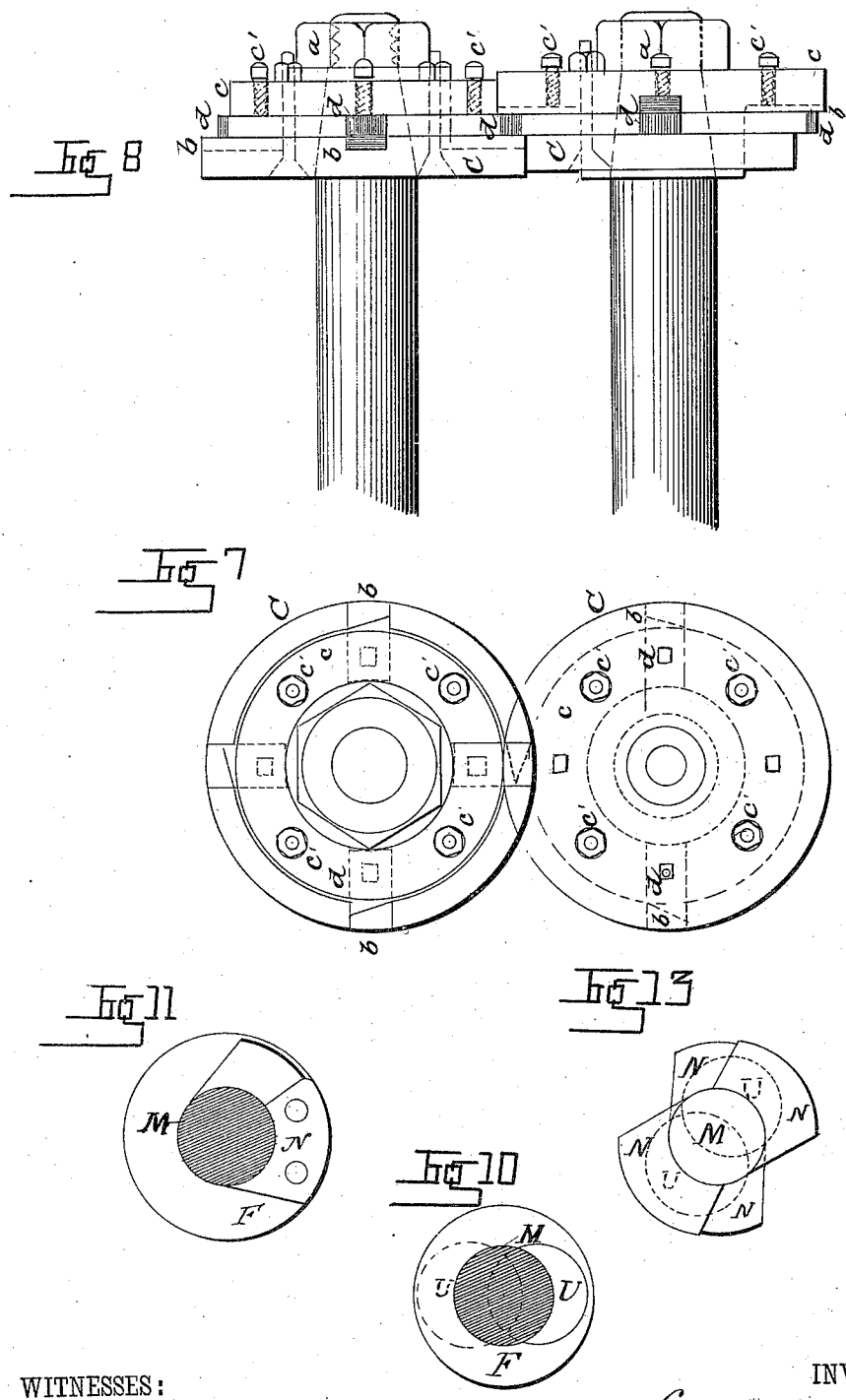
WITNESSES:
INVENTOR.
Leonard Acheson
By DeWitt C Allen
ATTORNEY (Model.) 7 Sheets—Sheet 7.
L. ACHESON.
MACHINE FOR MAKING RAILROAD SPIKES.
No. 307,420. Patented Nov. 4, 1884.
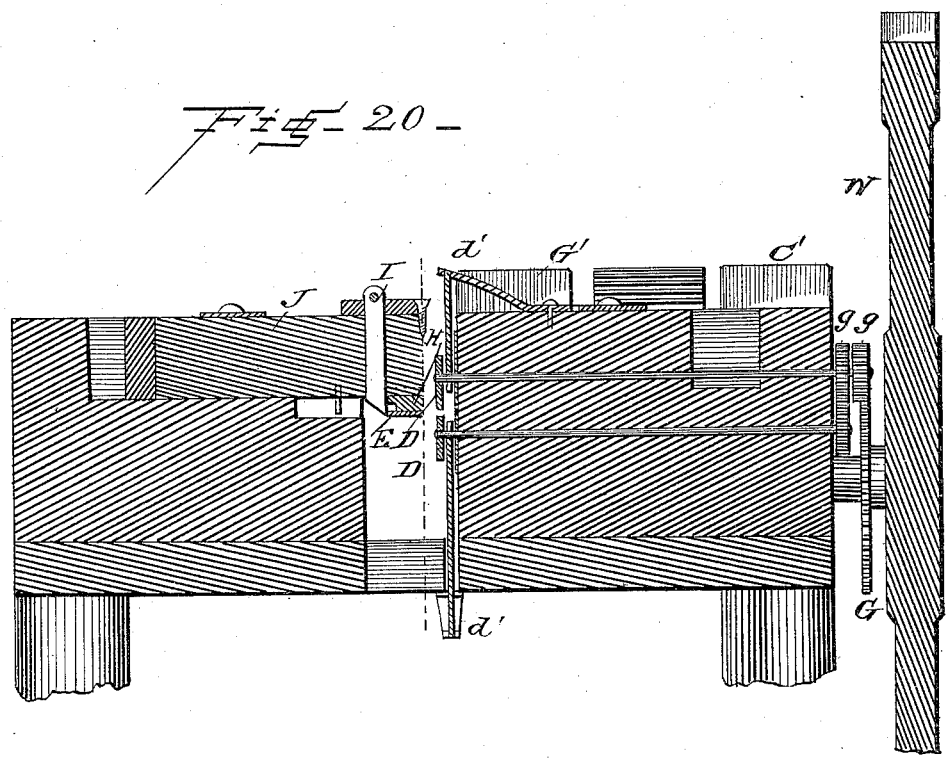
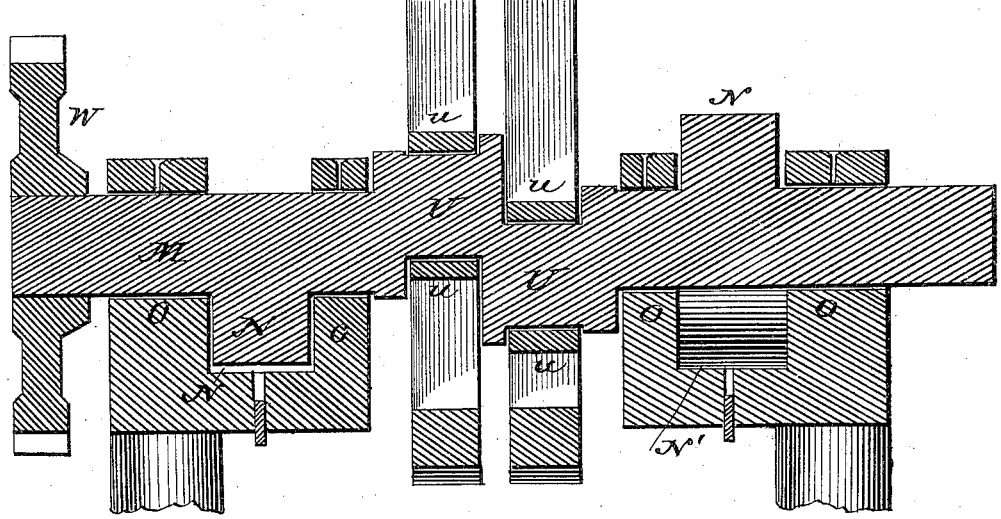
WITNESSES:
Fred G. Dieterich.
N. L. King.
INVENTOR.
Leonard Acheson
By DeWitt C. Allen
ATTORNEY

UNITED STATES PATENT OFFICE.

LEONARD ACHESON, OF CHATTANOOGA, TENNESSEE, ASSIGNOR OF ONE-HALF TO JAMES M. DUNCAN, OF SAME PLACE, AND HUGH L. FOX, OF ST. LOUIS, MISSOURI.

MACHINE FOR MAKING RAILROAD-SPIKES.

SPECIFICATION forming part of Letters Patent No. 307,420, dated November 4, 1884.

Application filed August 3, 1883. (Model.)

*To all whom it may concern:*

Be it known that I, LEONARD ACHESON, a citizen of the United States, residing at Chattanooga, in the county of Hamilton and State of Tennessee, have invented certain new and useful Improvements in Machines for Manufacturing Railroad-Spikes; and I do hereby declare the following to be a full, clear, and exact description of the invention, such as will enable others skilled in the art to which it appertains to make and use the same.

This invention relates to certain new and useful improvements in machines for making railroad-spikes, and has for its object the rapid production from bars of iron of spikes with perfectly-shaped heads and points, a further object being to make two spikes at each revolution of the main shaft of the machine; and to this end the invention consists in novel features of construction and combination and arrangement of parts, all as will be hereinafter fully described, and set forth in the claims hereto annexed.

Referring to the accompanying drawings, Figure 1 represents a view in perspective of my improved machine. Fig. 2 represents a top view or plan showing the position of parts when a spike is completed; Fig. 3, a longitudinal vertical central section showing a pointed blank just cut off and grasped by the feed-rolls to be fed forward to the heading mechanism; Fig. 4, a side elevation of the machine; Fig. 5, a horizontal section showing the position of parts when one spike, $s$, has been completed and is being thrown out of its die with a pointed blank, $s'$, fed forward in position to be carried to the opposite heading-die. Fig. 6 represents a longitudinal section showing the position of parts when a spike, $s$, has just been completed; Figs. 7 and 8, enlarged views of the cutter-heads; Fig. 9, detail view of main shaft and operating cams and cranks connected to and formed therewith; Fig. 10, cross-section through main shaft, showing in plain and dotted lines the different positions of one of the cranks in its revolution; Fig. 11, cross-section through main shaft, showing the manner in which one of the cams N is secured to one of the flanges F; Fig. 12, detailed horizontal section through Fig. 11; Fig. 13, cross-section through main shaft, showing in plain and dotted lines the different positions of one of the cranks and of the cams in their revolutions; Fig. 14, top sectional view of the operating-cranks; Fig. 15, top view or plan of the cross-plunger J; Fig. 16, view in perspective of the transverse die-carrier and operating parts connected thereto; Fig. 17, top view or plan of the transverse die-carrier and the heading-plungers; Fig. 18, side elevation of cross-plunger, showing the position of its operating parts with relation to the dies A A when said die-carrier is at its extreme movement in one direction; Fig. 19, central cross-section through Fig. 18; Fig. 20, vertical cross-section through the dotted lines $x\ x$ of Fig. 2; Fig. 21, vertical cross-section through the dotted lines $y\ y$ of Fig. 2.

Like letters of reference indicate like parts in the several figures of the drawings.

In the drawings, A A represent two stationary dies secured in the frame of the machine, and B B two movable headers adapted to work in connection with said dies for forming the heads of the spikes, as shown in Figs. 5 and 18.

C C represent two cutter-heads which revolve and draw the bar of iron between them as it comes from the rolls, without reheating, and at the same time points and cuts the iron bar into blanks of the required length to form the spikes.

D D, Figs. 3 and 20, represent the feed-rolls, arranged between the cutter-heads and the plate E, Figs. 18 and 20, connected to the under side of a transverse die-carrier, J, which also carries a top gripping-die, H, on its under side, and vertically-movable upright bars, I I, passing up through slots in said die-carrier, and having their lower ends beveled on the sides adjacent to the dies A A. These bars I I project below the die-carrier J a sufficient distance, so as not to allow the pointed blank $s'$ to be thrown or shaken off the sides of the plate E, and also at a sufficient distance from the sides of the top gripping-die, H, to admit the blanks to be fed or pushed in by the feed-rolls without being bound from any side. These steadying-bars I I, being beveled on the sides which come against the stationary dies A A, slide upon said dies, so that as the cross or transverse die-carrier travels in opposite directions they will pass over the spikes and fall down into their original position by their own weight. The die-carrier J is further provided on its under side with two clearing-pins, K K, for each stationary die A, and pass through and work in slots $k$ in said dies, as shown in Fig. 5. The die-carrier J is operated through the medium of slides L L of the machine, working at the angle of ninety degrees with themselves and parallel to the main shaft M. The ends of the die-carrier J are shaped or beveled to the angle of forty-five degrees, and the angle of each of the slides L which come against the ends of the die-carrier J are shaped or beveled at the same angle. The slides receive an alternate reciprocating movement through the medium of the cams N N, connected to or formed upon the main shaft M. The cam N on right-hand side of machine moves the slide on that side forward, so that its beveled end engages the beveled end of cross-plunger and moves it at right angles therewith, and the other end of cross-plunger comes in contact with the end of the slide on left-hand side of machine and moves it up against the shaft M. The right-hand cam N holds the slide in position until the pointed blank which is in the die A has been formed into a spike, when the left-hand cam moves the left slide forward and performs the same motion as the right-hand slide.

The main shaft M of the machine has four journal-bearings, O, as shown in Fig. 21, to support and make it as rigid as possible, one bearing on each outer side, and one between each cam, which works the slides, and each crank U, which works the heading-plungers R. The plungers R R, which move the headers B B, are adjustable as regards the angle they are required to travel at, to give the proper bend to the end of blank, so as to form the heads of the spikes. The arrangements to make them adjustable consist in the plates S S, in which the said heading-plungers work, said plates being held in position by a wrist, T, on each side. The wrists T are rigidly connected to or formed with the plates S, and fitted into the bottom side of machine, and held into position by journal-caps $t$, all as clearly shown in Fig. 3. The wrists allow the plates S to be set at any angle to the stationary dies A A, and when necessary can be set so that the heading-plungers R R will travel on a level or horizontal line with said dies. These heading-plungers receive their motion from cranks U U on main shaft M, said cranks working in brasses $u w$, which slide up and down in yokes Y Y and give the plungers the necessary forward motion. The yokes are placed nearly in the center of the said heading-plungers, and the rear ends of the plungers move in slides V V, set on the frame of the machine, and which can be raised or lowered to suit the angle for heading the end of the blank by liners or other suitable means, and when said slides are changed the plates S and wrists T turn in their journal-caps, and so are entirely controlled and adjusted by the slides V. The cams N, which operate the side plungers, L, (and effect the gripping of the spike-blanks,) are cast separate from the main shaft M, and are fitted and bolted to flanges F F on said main shaft, as shown in Figs. 11 and 12.

Underneath each of the cams N there is an oil-box, N', as shown in Fig. 21, cast in the bed-plate of the machine. The cams touch the oil in revolving, thus lubricating them, and also keeping the slides L well supplied with oil. This arrangement is a great advantage to cams of this kind which travel at a considerable speed, and which, when the blanks are in the dies, have a very severe friction on them. The cutter-heads C C have a continuous motion—that is, they do not stop at the cutting off of each blank—and are driven by gearing W W, as shown in Fig. 2, coming from main shaft to the lower cutter-head shaft. This shaft rests in housings G', and can be raised or lowered by set-screws $G^2$, to suit the size of cutters, (which governs the length of spike.) In the center of said cutter-shaft and between the housings there is mounted a pinion, X, keyed to the shaft, and which meshes into or with a similar-sized pinion mounted upon and keyed to the upper cutter-shaft. These pinions control the cutters in the heads, which have to come exactly on each other to cut off the blanks, and form the points on said blanks before going into the dies A A to be headed. The cutter-heads C are slipped over the ends of the shafts, which project through the housings the required distance, and said shafts are turned tapering with a feather in each, and have a nut, $a$, as shown in Fig. 8, on the outside, which holds the cutter-heads firmly in position on their shafts. The cutters $d$, which are made of cast-steel, are fitted into the heads at the required distances, and are held in place by wrought-iron rings $c$, bolted up against, and set-screws $c'$ going through said rings and bearing up against the cutters. (See Figs. 7 and 8.)

At the side of each of the cutters $d$ there are fitted pieces $b$ of hardened cast-steel, which keep the iron from spreading while it is being pressed or cut off.

The feed-rolls D get their motion by gearing G G, coming from the lower cutter-head shaft to the top feed-roll shaft, which latter shaft is connected by pinions $g$, to lower feed-roll shaft, all as clearly shown in Fig. 4. These feed-rolls are slipped on the ends of shafts, which have feathers fitted in and held on by nuts on the outside, and said rolls are held together by springs $d'$, as shown in Fig. 20, bearing upon the journal of the lower roll, and down on the journal of the top roll. As the blanks come from the cutter-heads, and are pushed against and between the rolls D D, which are parted the thickness of the blank, (see Fig. 3,) and as they push the blank forward onto the plate E and the point of blank comes between said rolls, they close together (through the medium of the springs) and still push the blank forward the required distance.

I do not wish to confine myself to one set of feed-rolls, as two or more sets may be used, with one set arranged in advance of the other, so that the blanks, when cut off, will pass to the first set, which transmits them to the second set, from which they are fed forward or pushed onto the plate E of the reciprocating die-carrier, which carries them to the heading-blanks A.

The operation of my improved machine is as follows: The iron bar from which the spikes is made is taken from the forming-rolls (without reheating) and passed between the cutter-heads C, which revolve and draw the bar in and at the same time points and cuts the bar into blanks of the required length, and said blanks, before they are entirely free from said cutter-heads, are pushed between and taken hold of by the feed-rolls D, (see Fig. 3,) which passes them forward onto the plate E, and between the top gripping-die, H, and the edge of the upright movable bar I, which steadies the blank on the plate E until the die-carrier J makes its stroke. The die-carrier in making the required distance moves the plate E until its edge comes against the edge of one of the stationary dies A, when the top and moving die H, carried by the die-carrier, pushes the blank from said plate into said lower and stationary die, A, thus gripping and holding the pointed blank in position until one of the headers B has finished its stroke and formed the head on said pointed blank and completes the spike, as shown in Fig. 6, and said spike is still held in the same position (although not gripped firm and tight) until the header B has drawn back to give the head of spike plenty of room to be cleared from the stationary die A, and at the same time to allow the next pointed blank, which has been coming in on the plate E, (to be headed by the die and header working on the other side of machine,) the required time to reach its proper position. The die-carrier now moves in the opposite direction, pushing the finished spike by means of the clearing-pins K from the die A and carrying the plate E, which holds the next blank to the other die A, which goes through the same process, and thereby making two spikes at each revolution of the main shaft.

My improved machine can be quickly and readily changed to make track-bolts and rivets by merely removing the cutter-heads and putting plain grooved rolls on their shafts, and which rolls are held together by springs, and when they have pushed the bar forward into the die A, and while the die-carrier is making its stroke and cutting off the blank, the grooved rolls will slip on the bar which is being fed in. The blanks are cut off by the top moving die, H, carried by the die-carrier, and are gripped in the same way as the spikes, using dies to suit whatever shape or size of iron that is wanted. The second alteration consists in merely lowering the back part of the heading-plungers until they travel on a level line with the stationary dies A, which will permit of putting the heads on straight, instead of bending down. The plungers are lowered through the medium of the vertically-adjustable slides V and pivoted plates S, as before described.

Having thus fully described my invention, what I claim as new, and desire to secure by Letters Patent, is—

1. The combination, with the stationary dies A A and movable headers B, of the transversely-movable die-carrier having die H and carrying plate E, and the revolving cutter-heads C C, substantially as and for the purpose herein shown and described.

2. The combination, with the stationary dies A A and movable headers B B, of the transversely-movable die-carrier having the die H and carrying-plate E, the feed-rolls D D, and revolving cutter-heads C C, substantially as and for the purpose herein shown and described.

3. The movable transverse die-carrier J, provided with the plate E, top gripping-die, H, and vertically-movable bars I I, constructed as shown, in combination with the stationary dies A A and movable headers B B, substantially as described.

4. The movable transverse die-carrier J, provided with the clearing-pins K K, in combination with the slotted stationary dies A A, substantially as and for the purpose herein shown and described.

5. The movable transverse die-carrier J, provided with the plate E, top gripping-die, H, vertically-movable bars I I, constructed as shown, and the clearing-pins K K, in combination with the slotted stationary dies A A and movable headers B B, substantially as and for the purpose described.

6. The combination, with the feed-rolls D D, of the continuously-revolving cutter-heads C C, constructed, as shown, for drawing in the bar of iron at one uniform rate of speed, cutting and pointing the blanks ready for heading, and pushing the blanks between said feed-rolls, and mechanism for heading said pointed blanks, substantially as described.

7. The combination, with the heading-plungers R R, of the plates S S, having wrists T T, and the journal-caps t t, for changing the angle of said plungers, substantially as herein shown and described.

8. The cutter-heads C C, feed-rolls D D, stationary dies A A, die-carrier J, provided with plate E, top gripping-die, H, and vertically-movable bars I I, in combination with the slides L L, plungers R R, carrying the headers B B, and the main shaft M, provided with cams N N, and cranks U U, for moving said slides and plungers L L and R R, substantially in the manner as and for the purpose herein shown and described.

9. The combination, with the main shaft having the cams N N and the slides L L, of the oil-boxes N' N', in which said cams revolve, substantially in the manner as and for the purpose herein shown and described.

In testimony whereof I affix my signature in presence of two witnesses.

LEONARD ACHESON.

Witnesses:
   JULIUS OCHS,
   ISIDOR WISE.